US006870129B2

(12) United States Patent
Hauer et al.

(10) Patent No.: US 6,870,129 B2
(45) Date of Patent: Mar. 22, 2005

(54) METHOD AND DEVICE FOR CUTTING A FLAT GLASS PLATE INTO A NUMBER OF RECTANGULAR PLATES

(75) Inventors: Dirk Hauer, Nordenham-Ellwürden (DE); Georg Geissler, Huenstetten-Wallrabenstein (DE); Bernd Hoetzel, Woerrstadt (DE); Thomas Lüttgens, Mainz (DE)

(73) Assignee: Schott Glas, Mainz (DE)

( * ) Notice: Subject to any disclaimer, the term of this patent is extended or adjusted under 35 U.S.C. 154(b) by 12 days.

(21) Appl. No.: 10/362,117

(22) PCT Filed: Jul. 20, 2001

(86) PCT No.: PCT/EP01/08397

§ 371 (c)(1),
(2), (4) Date: Jun. 5, 2003

(87) PCT Pub. No.: WO02/16276

PCT Pub. Date: Feb. 28, 2002

(65) Prior Publication Data

US 2004/0020960 A1 Feb. 5, 2004

(30) Foreign Application Priority Data

Aug. 24, 2000 (DE) .......................... 100 41 519

(51) Int. Cl.$^7$ ............................ B26F 3/00; B23K 26/38
(52) U.S. Cl. ............................ 219/121.72; 219/121.82; 225/2; 225/93.5
(58) Field of Search ................. 219/121.72, 121.82; 65/97, 98, 174; 83/879, 880, 882; 225/2, 93.5; 349/158

(56) References Cited

U.S. PATENT DOCUMENTS

| | | | | |
|---|---|---|---|---|
| 3,814,895 A | * | 6/1974 | Fredriksen | ............. 219/121.82 |
| 3,880,029 A | | 4/1975 | Bonaddio | |
| 3,976,288 A | * | 8/1976 | Cuomo, Jr. | .................. 269/21 |
| 4,187,755 A | | 2/1980 | Shirai | |
| 6,236,446 B1 | * | 5/2001 | Izumi et al. | ................ 349/187 |
| 6,423,930 B1 | * | 7/2002 | Matsumoto | ............ 219/121.69 |
| 6,590,181 B2 | * | 7/2003 | Choo et al. | ............ 219/121.68 |

FOREIGN PATENT DOCUMENTS

| | | |
|---|---|---|
| DE | 21 12 908 A | 9/1972 |
| DE | 43 05 107 C2 | 2/1995 |
| DE | 693 04 194 T2 | 1/1997 |
| EP | 0 872 303 A2 | 10/1998 |
| FR | 2 545 815 A | 11/1984 |
| GB | 2 303 095 A | 2/1997 |
| WO | 01 38039 A | 5/2001 |

OTHER PUBLICATIONS

Patent Abstracts of Japan vol. 2000, No. 11, Jan. 3, 2001 & JP 2000 219528 A, Aug. 8, 2000.
Patent Abstracts of Japan vol. 2999, No. 03, Mar. 30, 2000 & JP 11 342483 A, Dec. 14, 1999.
Patent Abstracts of Japan vol. 8, No. 212, Sep. 27, 1984 & JP 59 097545 A, Jun. 5, 1984.
Patent Abstracts of Japan vol. 2000, No. 12, Jan. 3, 2001 & JP 2000 247671 A, Sep. 12, 2000.

* cited by examiner

Primary Examiner—Geoffrey S. Evans

(57) ABSTRACT

The cutting of the flat glass plate (1) into rectangular plates with a predetermined edge length is performed by forming initial cracks at the beginning of cutting lines on the glass plate and moving a laser beam along the cutting lines followed by a cooling spot to induce a thermo-mechanical stress alone the cutting lines. First the glass plate (1) is cut apart into partial plates (2–5) along first parallel cutting lines spaced according to the predetermined edge length. Then the cut apart glass plate is rotated by 90° and the partial plates (2–5) are moved apart from each other. Subsequently the partial plates that have been moved apart are cut apart alone several parallel second cuts (4–9) perpendicular to the first cuts. This method facilitates exact placement of the initial cracks.

9 Claims, 4 Drawing Sheets

Figure 2:
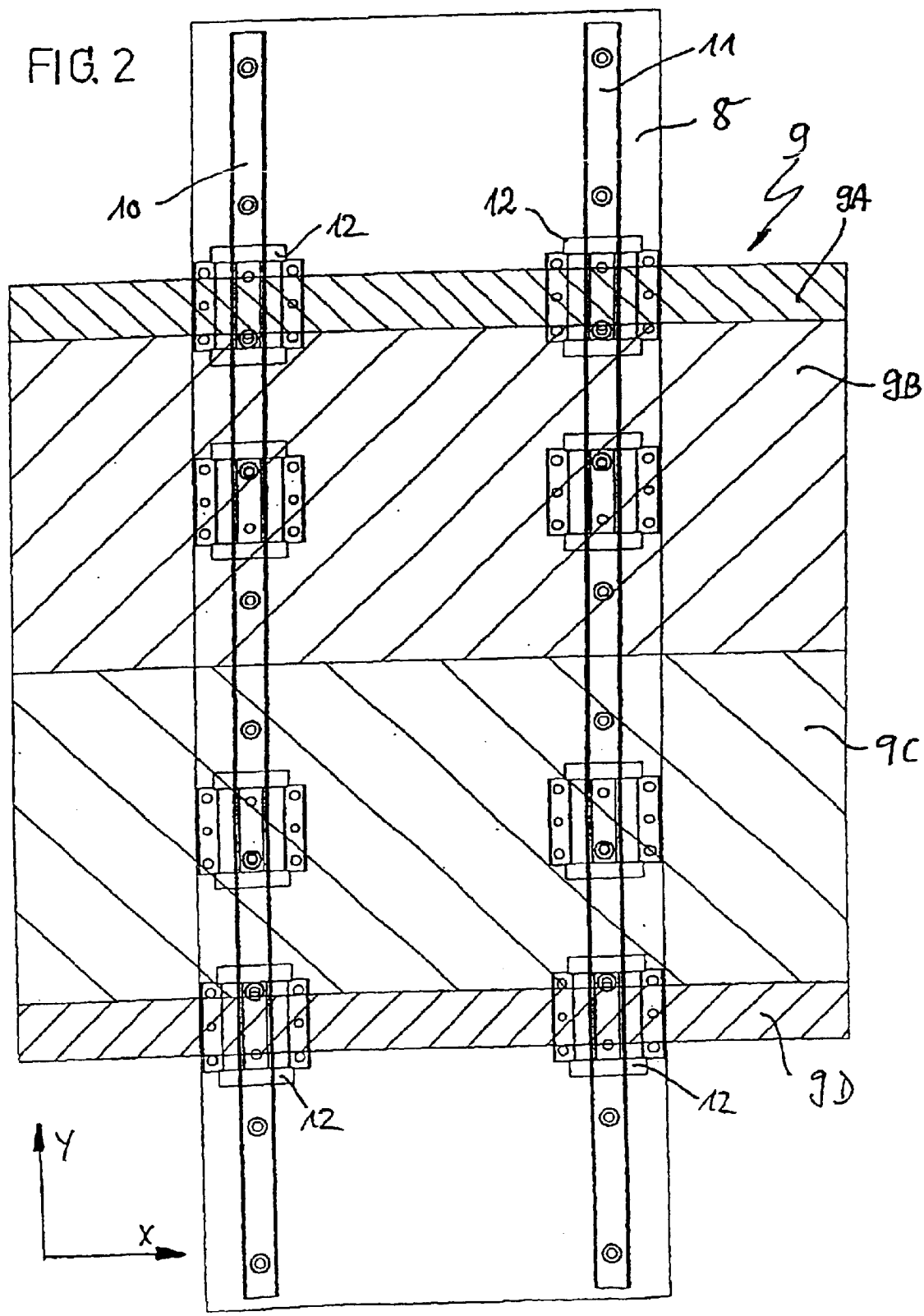

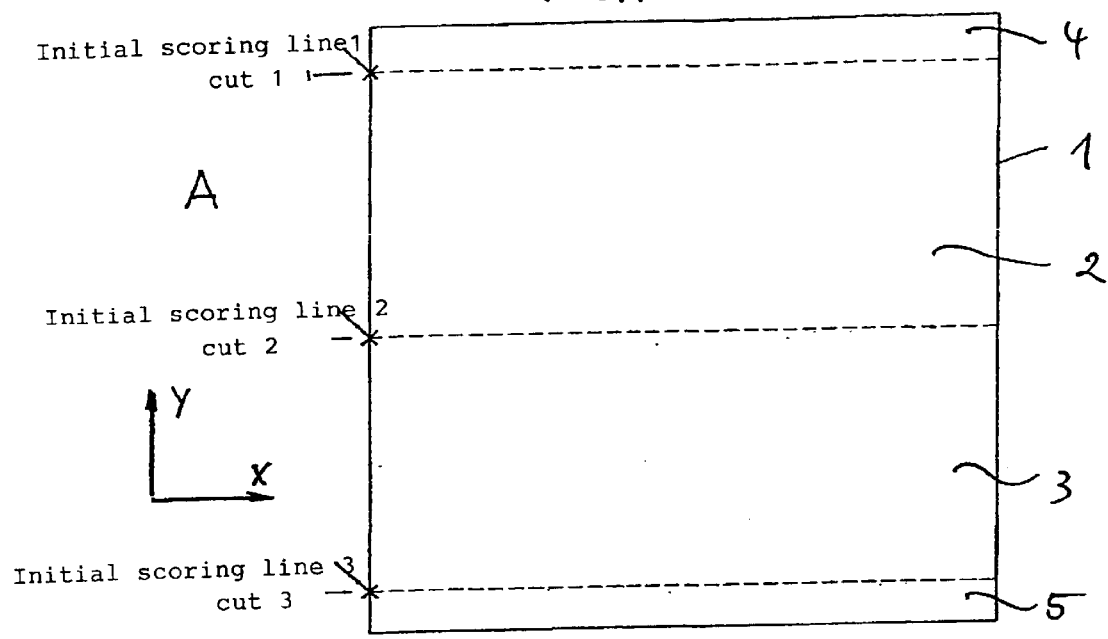
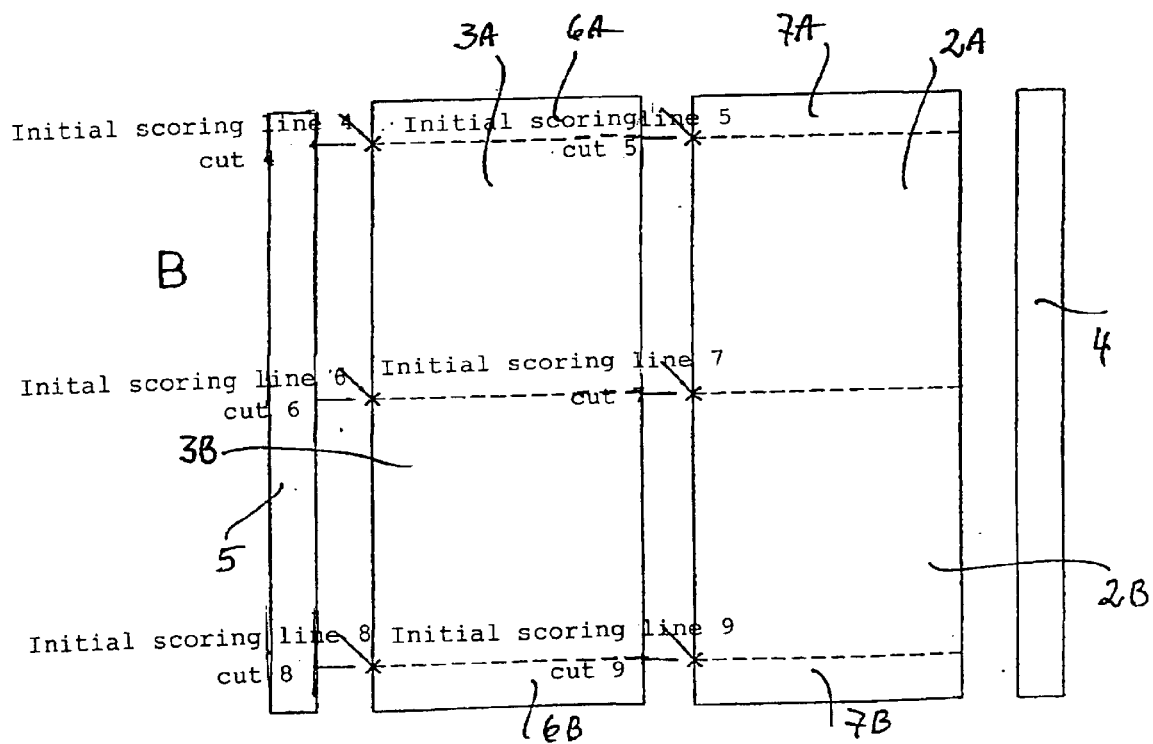
FIG.1

METHOD AND DEVICE FOR CUTTING A FLAT GLASS PLATE INTO A NUMBER OF RECTANGULAR PLATES

The invention relates to a method for cutting a flat glass plate into a plurality of rectangular plates of a predetermined edge length by means of a laser beam, moved along the cutting lines, in conjunction with an associated cooling spot for inducing a thermomechanical stress, which is above the breaking strength of the glass, along the cutting line and for inducing a mechanically induced initial crack at the beginning of each cutting line.

Conventional methods for separating flat glass are based on first creating a scored track in the glass by means of a diamond or a tiny cutting wheel, and then to break the glass by an external mechanical force along the weak point thus created (this is known as the scoring and breaking method). A disadvantage of this method is that because of the scored track, particles (splinters) are detached from the surface and can become deposited on the glass, where they can cause scratches, for instance. So-called conchoidal fractures can occur at the cut edge, making the edge of the glass uneven. Moreover, the microscopic cracks created upon scoring in the cut edge reduce its mechanical strength, or in other words increase the risk of breakage.

One way of avoiding both splinters and conchoidal fractures and microscopic cracks is to cut glass using thermally generated mechanical stress. In this method, a heat source that is aimed at the glass is moved at fixed speed relative to the glass, and thus such a high thermomechanical stress is generated that the glass develops cracks. The requisite property of the heat source of being able to position the thermal energy locally, that is, with a precision of better than 1 millimeter, which meets typical cutting precision requirements, is met by infrared radiators, special gas burners, and in particular, lasers. Lasers, because of their good focusability, good controllability of the power, and the capability of beam shaping and thus of intensity distribution over glass, have proven themselves and become established over time. With them it is possible both first to score the glass with the laser beam and then break it mechanically and to burn through the glass, that is, to cut it, directly with the beam in conjunction with a mechanically made starting crack, also called an initial scoring line or initial crack. The invention is based on the latter alternative way of cutting.

This laser beam cutting method, which by local heating through the focused laser beam in conjunction with cooling from outside induces a thermomechanical stress to beyond the breaking strength of the material, has been disclosed by various references, such as European Patent Disclosure EP 0 872 303 A2, German Patent Disclosure DE 693 04 194 T2, and German Patent DE 43 05 107 C2. It therefore need not be described in further detail here.

For numerous applications in the industry, particularly for producing display panels for modern communications products, such as cellular phones, small calculators and the like, thin rectangular panes of glass with predetermined edge lengths are required. These rectangular panes, a category that also includes square panes, are typically made by cutting a relatively large flat glass plate into a plurality of rectangular plates. In this process, the larger flat glass plate is first cut along a plurality of first cutting lines extending parallel to one another and is then cut along second cutting lines, also extending parallel to one another, that are offset from the first ones by 90°. The result, dictated by the points of intersection of the cutting lines that intersect at an angle of 90°, is the desired rectangular plates; the spacing between parallel cutting lines dictates the respective edge lengths of the rectangular plates.

In this methodology for producing rectangular panes by cutting apart a larger flat pane of glass, because of the starting crack that for reasons of the method must necessarily be made mechanically, typically by means of a tiny cutting wheel, that following problems arise. While in making the starting crack in the first cutting lines the tiny cutting wheel can be placed dimensionally precisely at the edge of the flat glass plate to be cut apart, or in other words a starting crack can be generated in an optimal way, this is no longer true for the second cutting lines that are offset by 90°. Then the tiny cutting wheel must be placed from above on the point intersection of the two cutting lines extending at 90° from one another. This requires not only a very precise, point-accurate positioning of the tiny cutting wheel by means of a suitably precisely operating controller, but also for reasons of the method necessarily means that the corners of four rectangular plates that each converge at the points of intersection of the cutting lines can all be damaged, since the starting crack cannot, as in the case of the first cutting lines, be positioned at the edge of the plate, so that the damage to the plate can be kept quite slight, but instead must be positioned, moving from above, relatively shallowly at the point of intersection of the cutting lines.

To overcome these disadvantages, the rectangular plates could not be cut through and separated into individual plates in a single operation; that is, the process of cutting them apart had to be interrupted.

The object of the invention was to conduct the method described above and to embody the associated device for performing it in such a way that even with regard to the two cutting lines, a starting crack can be placed exactly mechanically without major damage to the plates, in a single operation, that is, without interrupting the process of cutting plates apart, with only the same slight effort as is involved in placing the starting crack for the first cutting lines.

In the method, on the basis of the initially defined method for cutting a flat glass plate into a plurality of rectangular plates of a predetermined edge length by means of a laser beam, moved along the cutting lines, in conjunction with an associated cooling spot for inducing a thermomechanical stress, which is above the breaking strength of the glass, along the cutting line, as well as for inducing a mechanically induced initial crack at the beginning of each cutting line, this object is attained according to the invention with the following steps:

cutting apart the flat glass plate, in a basic position, along a plurality of parallel first cutting lines, whose spacing is determined in accordance with the predetermined length of the one edge of the rectangular plates, into a plurality of partial plates with induction of the initial crack at the beginning of each cutting line at the each of the flat glass plate, rotating the flat glass plate, thus cut apart, by 90° and moving the cut partial plates apart to a predetermined spacing from one another, and cutting apart the partial plates that have been moved apart along a plurality of parallel, second cutting lines, which extend perpendicular to the first cutting lines and whose spacing is determined in accordance with the predetermined length of the other edge of the rectangular plates to be cut to size into these rectangular plates, with induction of the initial crack at the beginning of each cutting line at the edge of each partial plate.

With respect to the device described at the outset for severing a flat glass plate into a plurality of rectangular plates of predetermined edge length by means of a laser-beam cutting device, this object is attained according to the invention with a cutting table, constructed rotatably by 90° on the base body, on which table the flat glass plate can be fastened, and which table comprises a plurality of table segments, which are disposed on the base body in such a way that they can be moved apart from one another.

By the provisions of the invention, it is therefore possible with the aid of the stress-induced cutting of glass with a laser, to sever panes of glass and cut them into individual pieces in a single operation, without interrupting the process of cutting them apart. It is furthermore possible for the initial crack required for the laser cut to be placed exactly, and to keep the damage caused upon introducing the initial crack minimal.

Particular advantages are attained in one embodiment of the invention with a method sequence in which the peripheral regions of the flat glass plate are in each case cut off in the form of trimming plates.

An especially exactly placed initial crack is achieved, in a refinement of the invention, with a method course in which the induction of the initial crack is effected by means of a tiny hard-metal cutting wheel moved in controlled fashion, which is lowered to in front of the particular glass edge to be scored and is then moved against the edge to begin scoring it.

In terms of the device, the requisite exact, replicable moving apart of the table segments can be accomplished, in an embodiment of the invention, by a device in which two parallel guide rails are secured to the base body, and each table segment is secured to two trolleys, which are received displaceably in the guide rails by drive systems.

Preferably, a vacuum system for fastening the flat glass plate and the cut-apart partial plates is assigned to the cutting table of the device, in a manner known per se. Particular advantages are attained then if a separately triggerable vacuum field is assigned to each table segment. As a result, the partial plates cut to size can be fixed and separated separately, thus averting any negative impact of the glass, which might have become warped by the vacuum, on the ensuing laser cut.

Since in laser beam cutting an exactly placed initial crack is crucial, one feature of the invention provides a device in which to generate a mechanical initial crack, a tiny hard-metal cutting wheel which is positionable in its motion is provided. In order then to reduce the risk that the tiny cutting wheel will touch the cutting table, which particularly with thin glass, because of the unavoidable unevenness of the cutting table might be possible as the tiny cutting wheel is constantly moved toward it, and to prevent the cooling air, which is associated with the cutting laser beam spot, from lifting the glass plate during cutting, one feature of the invention provides a device in which a countersunk groove is embodied in the table segments along the cutting lines, in the 90° position of the cutting table, the table segments having been moved apart from one another. The cooling air blown at the glass can then escape via this groove; or, if the tiny cutting wheel is positioned below the glass plate, the tiny cutting wheel can dip into this groove without damage.

The invention is described in further detail in terms of an exemplary embodiment shown in the drawing.

Figure 3:
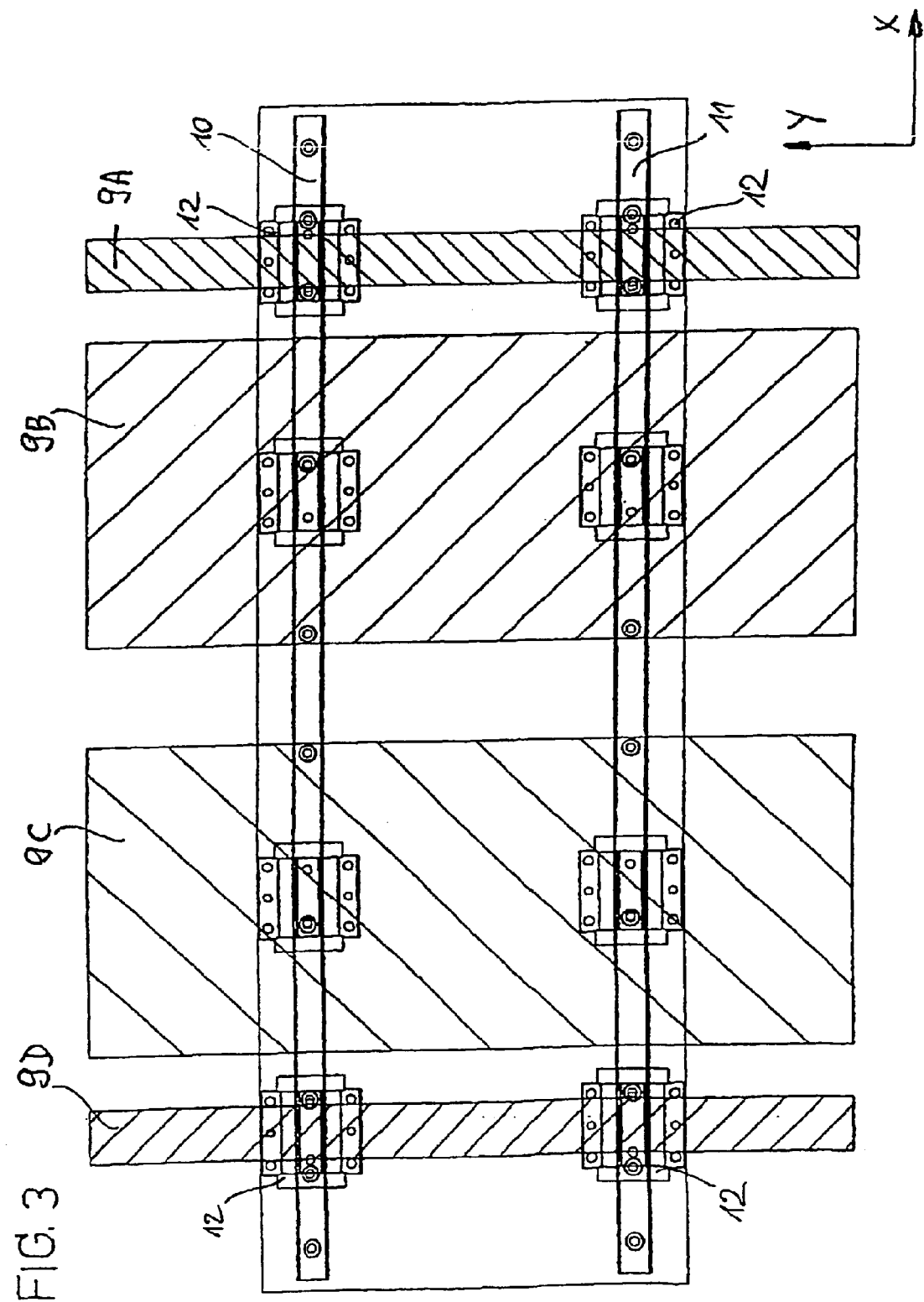

Shown are:

FIG. 1, in two parts A and B, the fundamental principle of cutting a flat glass plate apart into a plurality of rectangular plates by means of laser beam cutting in conjunction with a mechanical initial crack, having first cutting lines along one edge of the rectangle in a basic position of the flat glass plate shown in part A, and having second cutting lines along the other edge of the rectangle, in a position of the flat glass plate rotated by 90°, as shown in part B;

FIG. 2, a preferred exemplary embodiment of the cutting device of the invention, with a cutting table rotatable by 90°, shown in its basic position and comprising a plurality of table segments, which are movable apart via trolleys and guide rails that are mounted on a base body;

FIG. 3, the cutting table of FIG. 2 in the 90° position; and

Figure 4:
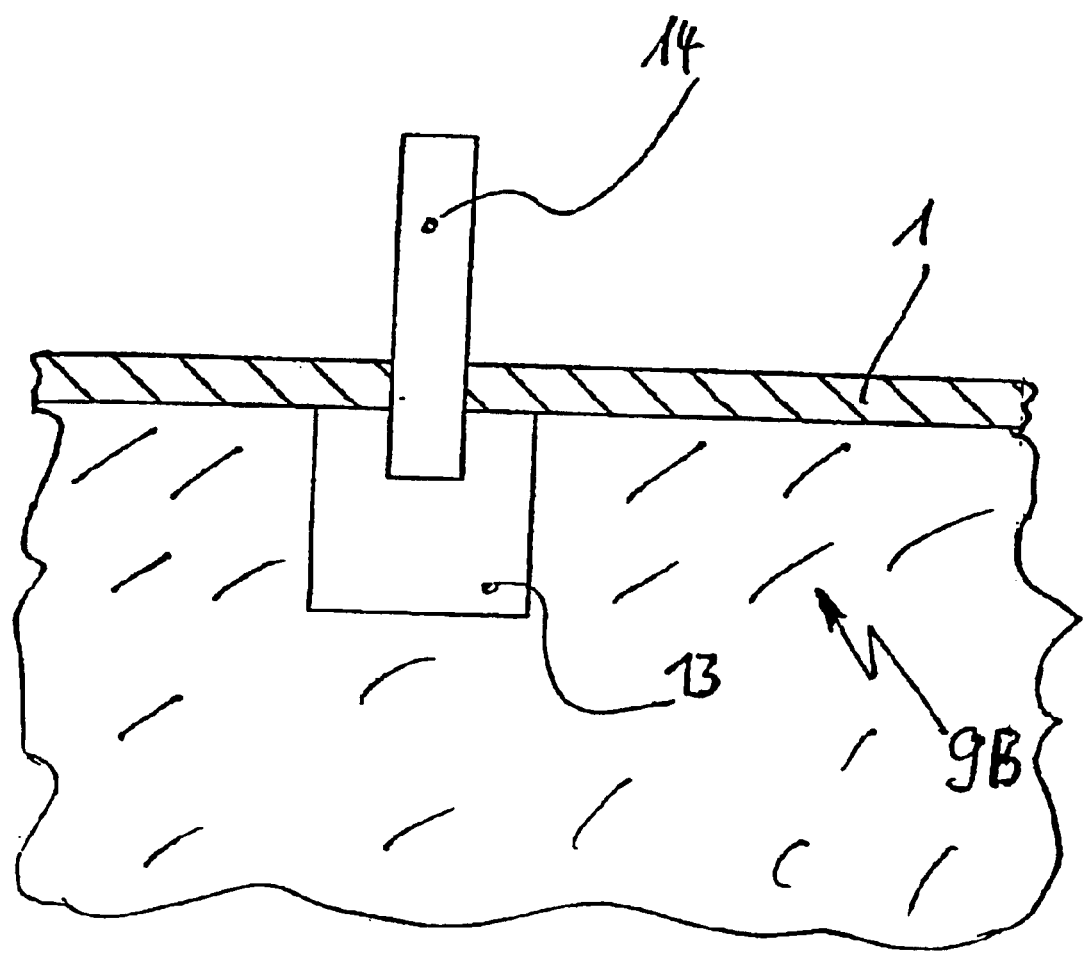

FIG. 4, an embodiment with grooves integrated with the table segments along the cutting lines.

FIG. 1, in both parts A and B, illustrates the fundamental principle of the method of the invention for severing a flat glass plate 1 into a plurality of rectangular plates, in this case four of them. In the first step, in the 0° position, that is, the basic position of the flat glass plate 1, which is shown in part A, three parallel cutting lines 1–3 with associated starting cracks, that is, initial scoring lines 1–3, which are typically made mechanically by a tiny cutting wheel, are made in the flat glass plate in the X direction by laser beam cutting. The initial scoring lines 1–3 can optimally be placed precisely at the edge of the flat glass plate 1, with minimal damage to the plate in the area around the initial scoring line.

Laser beam cutting is known, for instance from the references cited above. In it, a laser beam with a predetermined beam profile and a correspondingly configured cutting spot is moved along the cutting lines. Because of the high temperature in the flat glass plate 1 that is generated by the laser beam, a thermomechanical stress is created in the flat glass plate 1 along the cutting line to be cut.

To increase the thermomechanical stress, cooling in the form of a cooling spot is made to track the cutting spot at a defined spacing along the cutting line. This cooling spot, which can also be placed concentrically with the cutting spot, is created for instance by blowing cold air or gas/liquid mixtures through a nozzle. Because the initial scoring line weakens the glass at the starting point of the cutting, the glass then cracks along the cutting lines because of the thermomechanical stress that has been built up.

Once the cuts 1–3 of part A have been made, which leads to two good glass plates 2 and 3 as well as two trimming plates 4 and 5 on the edge, the cut-apart flat glass plate 1 is rotated by 90° in order to define three further parallel cutting lines again in the X direction, which intersect the cutting lines 1–3 of part A at an angle of 90°.

The initial cracks, that is, the initial scoring lines for the good glass plates 2 and 3 obtained from the first cut must now be induced at the glass edge of the laser cut 1–3 made beforehand. So that this initial crack will be minimal and the glass will be damaged only at the requisite point, according to the invention, before the initial scoring line is made, the good glass plates 2, 3 and the peripheral trimming plates 4, 5 made in the first cutting operation are moved apart to a predetermined distance. This situation is shown in part B. To achieve this motion apart without any losses in accuracy, it is embodied very exactly and replicably.

By means of the second, parallel cuts 4, 5 and 8, made by the laser beam, in conjunction with the associated initial scoring lines with the same reference numerals, the good plate 3 is divided into two rectangular plates 3A and 3B, along with two peripheral trimming plates 6A and 6B. Accordingly, the good plate 2 is cut apart, by means of the parallel second cuts 5, 7 and 9 performed by the laser beam, in conjunction with the associated initial scoring lines of the same reference numerals, into two rectangular plates 2A and 2B and two peripheral trimming plates 7A and 7B. Thus in a single operation, without interrupting the process of cutting them apart, four rectangular plates 2A, 2B, 3A and 3B of predetermined edge lengths are created, which at the placed initial scoring line points have only minimal unavoidable damage, which does not impair their later use.

FIG. 2 shows the cutting device of the invention, for performing the above-described method of the invention, in the 0° position as in FIG. 1, part A. The cutting device comprises a base plate 8, on which a cutting table 9 is constructed, on which the flat glass plate 1 of FIG. 1, to be cut apart, is fastened by exerting a negative pressure.

This cutting table comprises four table segments 9A–9D, shown shaded, which are congruent with the partial glass plates 2–5 to be cut in accordance with FIG. 1. The table segments should be adapted in number and dimensions to the number and edge lengths of the partial glass plates to be cut.

On the base plate 8, two parallel guide rails 10, 11, for each of four trolleys 12 guided on them, are secured; for the sake of simplicity, only some trolleys have been identified by reference numerals. Each table segment 9A–9D is connected to one pair of trolleys 12, so that each table segment can be displaced on the guide rails 10, 11 in the Y direction, in the basic position, and in the X direction in the position rotated by 90° from it.

The table segments 9A–9D are preferably embodied such that each assigned a separately triggerable vacuum field, so that the partial glass plates created after the machining process can be fixed and separated separately, so that a negative impact on the laser cut from the glass which might be warped from the vacuum can be avoided.

The displacement of the table segments can be achieved with various types of drive mechanism, for instance with a pneumatic or hydraulic drive system, by electric motor, or electromagnetically by means of a lifting system.

In the basic position shown in FIG. 2 for the cutting table 9, the first three cuts 1–3, shown in FIG. 1A, together with the associated initial scoring line are made along the lines of contact between the table segments. Thus cut 1, for instance, extends along the line of contact between the table segments 9A and 9B. The initial scoring line is positioned in each case laterally of the left-hand edge of the flat glass plate 1, so that the damage to the top and bottom faces of the glass is minimal.

In FIG. 3, the cutting device for making the three cutting lines for creating the cuts 4–9 of FIG. 1B is shown, in the position of the cutting table that has been rotated by 90°. The cutting direction, in this 90° position of FIG. 3, is once again the X direction. In order to be able to make the initial scoring line laterally of the edge for the partial glass plates 2 and 3 as well, the associated table segments 9B and 9C, as well as the adjoining table segments 9A and 9B associated with the trimming partial plates 4, 5, are moved in the X direction at a predetermined spacing from one another, so that a tiny cutting wheel that typically creates the initial scoring line can be moved between the table segments and then can be moved laterally against the applicable edge of the glass.

FIG. 4, in an enlarged detail looking toward the face end of a table segment, for instance the table segment 9B of FIG. 3, shows a preferred variant of the cutting device of the invention, with grooves 13 integrated into the table segments directly below the cutting lines that are to be made in the flat glass plate 1. These grooves typically have a size of approximately 2 mm×1 mm. The cooling air associated with the laser beam cutting spot can thus escape via the groove beneath the pane of glass as the cut begins to be made in the flat glass plate 1, thus preventing the cooling air from lifting up the cut partial plate. Moreover, when thin glass is cut, the scoring tool 14, such as a tiny hard-metal wheel, can plunge into the groove 13 without the risk that the cutting table will be touched by the scoring tool as the glass begins to be scored. Because of the unavoidably variable unevenness of the cutting table plate, it can in fact happen, if the flat glass plates are thin enough and the position of the scoring tool 1 is firm, that the scoring tool will be lowered to below the flat glass plate 1, which if there were no groove could damage the cutting table and make the scoring tool dull.

What is claimed is:

1. A method for cutting a flat glass plate (1) into a plurality of rectangular plates (2A, 2B, 3A, 3B) of a predetermined edge length by means of a laser beam, moved along the cutting lines, in conjunction with an associated cooling spot for inducing a thermomechanical stress along the cutting line, which is above the breaking strength of the glass, as well as for inducing a mechanically induced initial crack at the beginning of each cutting line, having the following steps:

cutting apart the flat glass plate (1), in a basic position, along a plurality of parallel first cutting lines (cuts 1–3), whose spacing is determined in accordance with the predetermined length of the one edge of the rectangular plates, into a plurality of partial plates (2–5) with induction of the initial crack at the beginning of each cutting line at the each of the flat glass plate (1), rotating the flat glass plate (1), thus cut apart, by 90° and moving the cut partial plates (2–5) apart to a predetermined spacing from one another, and cutting apart the partial plates (2–5) that have been moved apart along a plurality of parallel, second cutting lines (cuts 4–9), which extend perpendicular to the first cutting lines and whose spacing is determined in accordance with the predetermined length of the other edge of the rectangular plates to be cut to size into these rectangular plates (2A, 2B, 3A, 3B), with induction of the initial crack at the beginning of each cutting line at the edge of each partial plate.

2. The method of claim 1, in which the peripheral regions of the flat glass plate (1) are in each case cut off in the form of trimming plates (4, 5, 6A, 7A, 7B).

3. The method of claim 1, in which the induction of the initial crack is effected by means of a tiny hard-metal cutting wheel (14) moved in controlled fashion, which is lowered to in front of the particular glass edge to be scored and is then moved against the edge to begin scoring it.

4. A device for severing a flat glass plate (1) into a plurality of rectangular plates (2A, 2B, 3A, 3B) of predetermined edge length by means of a laser-beam cutting device, having a cutting table (9), constructed rotatably by 90° on the base body (8), on which table the flat glass plate (1) can be fastened, and which table comprises a plurality of table segments (9A–9D), which are disposed on the base body (8) in such a way that they can be moved apart from one another.

5. The device of claim 4, in which two parallel guide rails (10, 11) are secured to the base body (8), and each table segment (9A–9D) is secured to two trolleys (12), which are received displaceably in the guide rails (10, 11) by drive systems.

6. The device of claim 4, in which a vacuum system for fastening the flat glass plate (1) and the cut apart partial plates (2, 3, 2A, 2B, 3A, 3B) is assigned to the cutting table (9).

7. The device of claim 6, in which a separately triggerable vacuum field is assigned to each table segment (9A–9D).

8. The device of one of claims 4, in which to generate a mechanical initial crack, a tiny hard-metal cutting wheel (14) which is positionable in its motion is provided.

9. The device of one of claim 4, in which a countersunk groove (13) is embodied in the table segments (9A–9D) along the cutting lines, in the 90° position of the cutting table, with the table segments moved apart from one another.

* * * * *